US012539921B2

(12) United States Patent
Farooq et al.

(10) Patent No.: US 12,539,921 B2
(45) Date of Patent: Feb. 3, 2026

(54) VEHICLE-HOOD ASSEMBLY INCLUDING AN ENERGY ABSORBER

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 18/318,048

(22) Filed: May 16, 2023

(65) Prior Publication Data

US 2024/0383537 A1 Nov. 21, 2024

(51) Int. Cl.
*B62D 25/12* (2006.01)
*B60R 21/34* (2011.01)

(52) U.S. Cl.
CPC .............. *B62D 25/12* (2013.01); *B60R 21/34* (2013.01); *B60R 2021/346* (2013.01)

(58) Field of Classification Search
CPC ... B60R 21/34; B60R 2021/346; B62D 25/10; B62D 25/12
See application file for complete search history.

(56) References Cited

U.S. PATENT DOCUMENTS

| 3,853,334 | A | 12/1974 | Auman et al. |
| 6,848,738 | B2 | 2/2005 | Kempf et al. |
| 7,264,271 | B2 | 9/2007 | Barvosa-Carter et al. |
| 7,549,663 | B2 | 6/2009 | Takimoto et al. |
| 7,669,884 | B2 * | 3/2010 | Kikuchi ................ B60R 21/216 180/274 |
| 7,950,488 | B2 | 5/2011 | Browne et al. |
| 8,235,159 | B2 | 8/2012 | Mildner |
| 9,205,794 | B1 * | 12/2015 | Farooq .................... B60R 19/18 |
| 9,399,443 | B2 | 7/2016 | Jayasuriya et al. |
| 2002/0074775 | A1 * | 6/2002 | Ryan ................... B60R 21/2346 296/84.1 |
| 2005/0257979 | A1 | 11/2005 | Hamada et al. |

FOREIGN PATENT DOCUMENTS

| DE | 19654447 A1 * | 7/1997 | ............ B60R 21/34 |
| DE | 10247800 A1 | 4/2004 | |

* cited by examiner

*Primary Examiner* — Dany E Akakpo
(74) *Attorney, Agent, or Firm* — Frank A. Mackenzie; Brooks Kushman P.C.

(57) ABSTRACT

A vehicle includes a windshield and a vehicle hood. The vehicle includes an energy absorber fixed to the vehicle hood. The energy absorber is releasable from a compressed position to an uncompressed position. The energy absorber is spaced from the windshield in the compressed position and abuts the windshield in the uncompressed position. The energy absorber includes a chamber that is sealed and vacuum pressurized in the compressed position. The vehicle includes an actuator configured to unseal the chamber to release the energy absorber from the compressed position to the uncompressed position.

19 Claims, 10 Drawing Sheets

VEHICLE-HOOD ASSEMBLY INCLUDING AN ENERGY ABSORBER

BACKGROUND

The vehicle may include a pedestrian protection device such as an airbag deployable during certain pedestrian impacts to control the kinematics of a pedestrian outside of the vehicle during the pedestrian impact. The airbag may be inflatable over a hood and/or front bumper of the vehicle. Specifically, the airbag may be a component of an airbag assembly including an inflator that inflates the airbag in response to certain detected pedestrian impact.

DETAILED DESCRIPTION

A vehicle includes a windshield and a vehicle hood. The vehicle includes an energy absorber fixed to the vehicle hood. The energy absorber is releasable from a compressed position to an uncompressed position. The energy absorber is spaced from the windshield in the compressed position and abuts the windshield in the uncompressed position. The energy absorber includes a chamber that is sealed and vacuum pressurized in the compressed position. The vehicle includes an actuator configured to unseal the chamber to release the energy absorber from the compressed position to the uncompressed position.

The vehicle may include a first front pillar and a second front pillar. The energy absorber may be elongated from the first front pillar toward the second front pillar in the uncompressed position.

The energy absorber may include open-celled foam.

The energy absorber may include foam in the chamber and a membrane that may surround the chamber. The membrane may be impermeable to air. The energy absorber may include a plug through the membrane. The actuator may be operatively connected to the plug to disconnect the plug from the membrane. The vehicle may include a cord. The cord may extend from the actuator to the plug. The energy absorber may include two plugs spaced from each other along the membrane and each plug may extend through the membrane. The actuator may be operatively connected to both plugs to disconnect both plugs from the membrane. The vehicle may include a cord. The cord may extend from the actuator to the energy absorber. The vehicle may include a second cord. The second cord may extend from the actuator to the energy absorber. The second cord may be spaced from the cord at the energy absorber.

The actuator may be a pyrotechnic actuator.

The vehicle may include a chute connected to the vehicle hood and positioned to direct the energy absorber toward the windshield from the compressed position to the uncompressed position.

The energy absorber may be elongated in a cross-vehicle direction in the uncompressed position.

The vehicle hood may have a bottom surface and the energy absorber may be mounted to the bottom surface. The actuator may be mounted to the bottom surface of the vehicle hood. The vehicle hood may have a vehicle-forward end and a vehicle-rearward end disposed vehicle rearward of the vehicle-forward end. The energy absorber may be mounted to the vehicle hood at the vehicle-rearward end.

The energy absorber in the uncompressed position may include a rearward edge that may abut the windshield. The rearward edge may be spaced vehicle-rearward from the vehicle hood and above the vehicle hood in the uncompressed position. The vehicle hood may have a vehicle-forward end and a vehicle-rearward end disposed vehicle rearward of the vehicle-forward end. The energy absorber may be mounted to the vehicle hood at the vehicle-rearward end in the compressed position. The rearward edge of the energy absorber may be spaced vehicle-rearward from the vehicle-rearward end of the vehicle hood and above the vehicle-rearward end of the vehicle hood.

Figure 1:
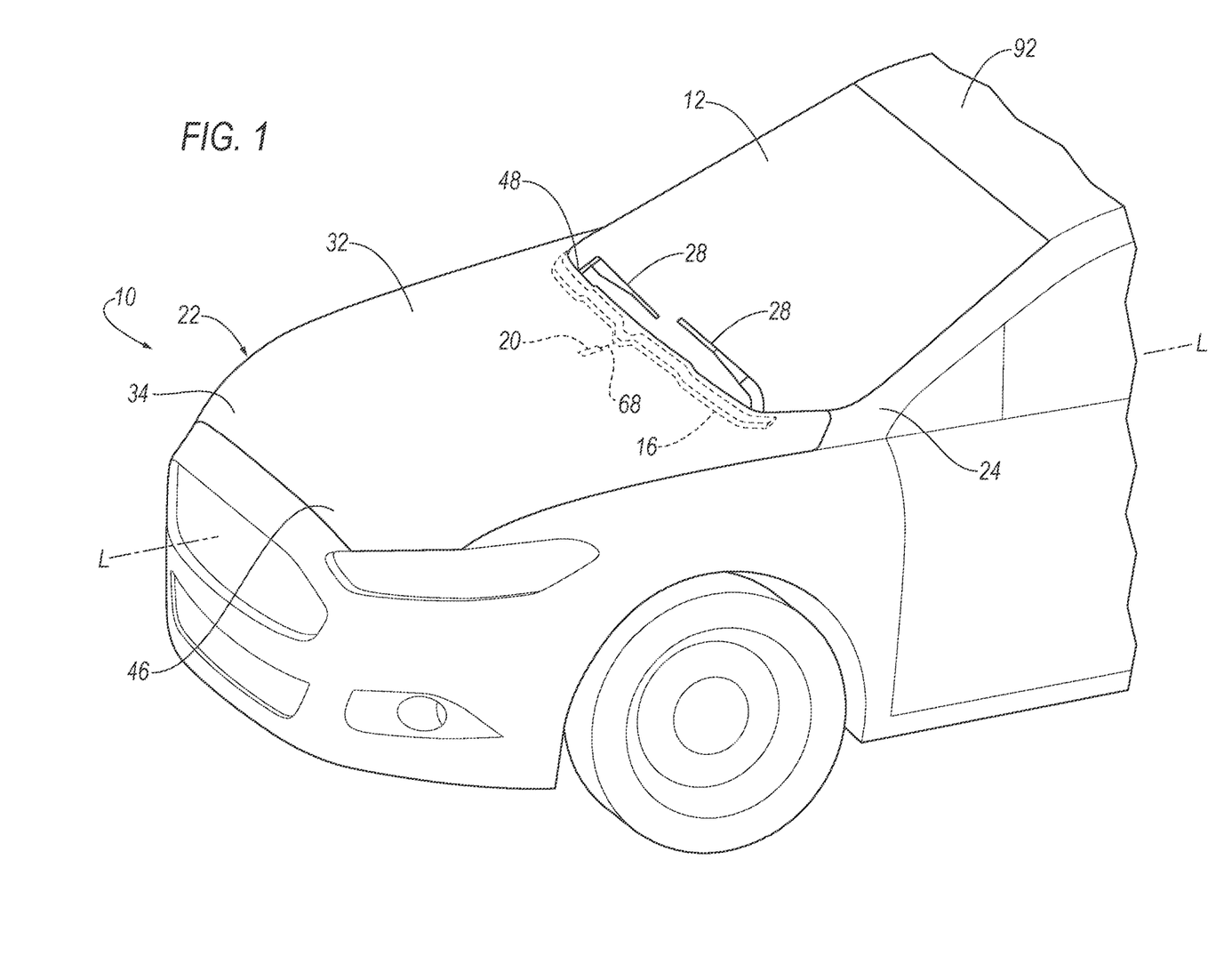
FIG. 1 is a perspective view of a vehicle with a vehicle hood with an energy absorber in a compressed position in broken lines below the vehicle hood.
Figure 2:
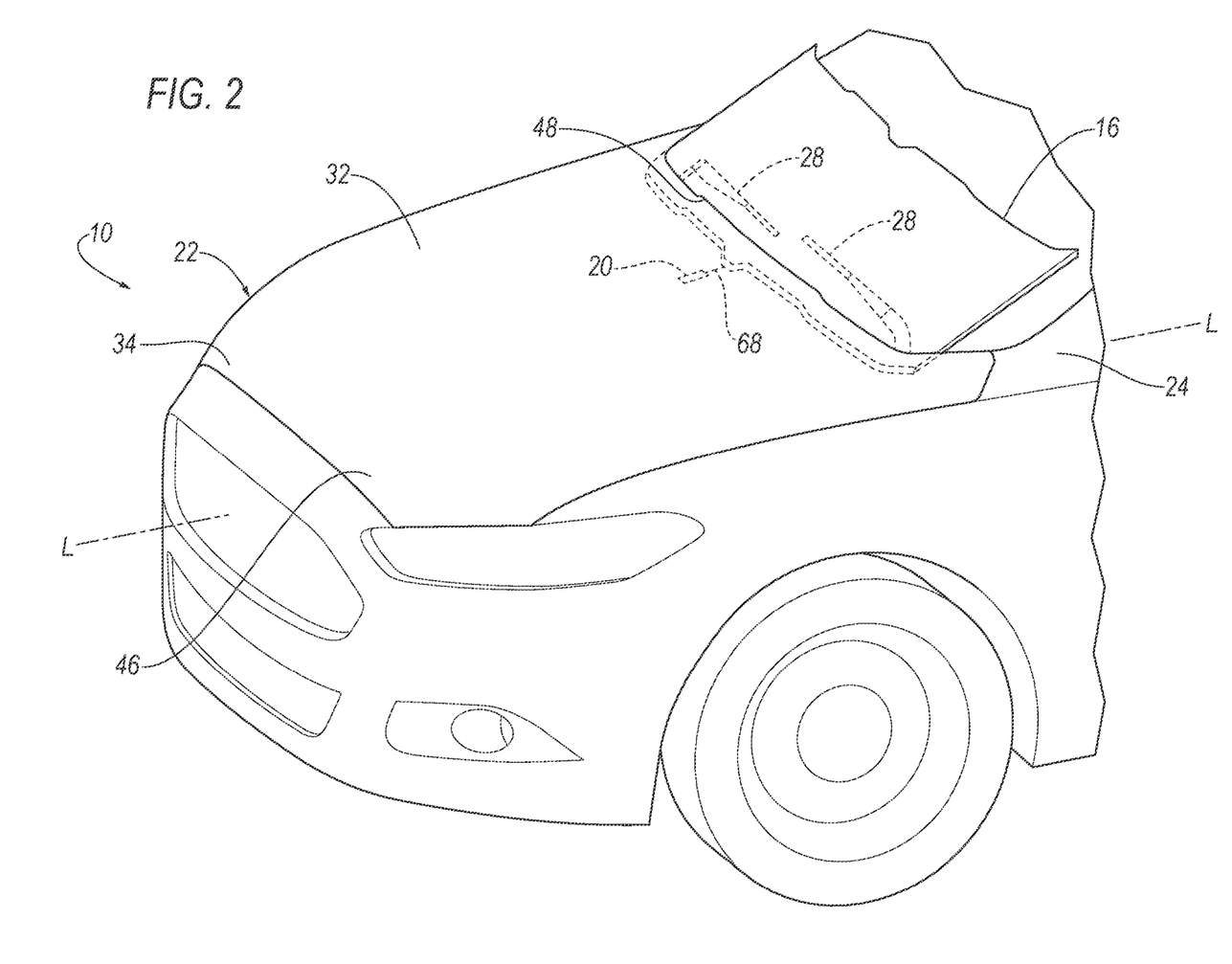
FIG. 2 is a perspective view of the vehicle with the vehicle hood with the energy absorber in an uncompressed position extending from below the vehicle hood.

With reference to the Figures, wherein like numerals indicate like parts throughout the several views, a vehicle 10 includes a windshield 12 and a vehicle hood 14. The vehicle 10 includes an energy absorber 16 fixed to the vehicle hood 14. The energy absorber 16 is releasable from a compressed position, as shown in FIG. 1, to an uncompressed position, as shown in FIG. 2. The energy absorber 16 is spaced from the windshield 12 in the compressed position and abuts the windshield 12 in the uncompressed position. The energy absorber 16 includes a chamber 18 that is sealed and vacuum pressurized in the compressed position. The vehicle 10 includes an actuator 20 configured to unseal the chamber 18 to release the energy absorber 16 from the compressed position to the uncompressed position.

The energy absorber 16 consumes less space in the compressed position relative to the uncompressed position to reduce packaging constraints in the design of the vehicle hood 14. The energy absorber 16 is attached to the vehicle hood 14 and may be released from the compressed position to the uncompressed position in response to certain pedestrian impacts. The energy absorber 16 includes the chamber 18 that is vacuum sealed in the compressed position. Since the chamber 18 is sealed and vacuum pressurized in the compressed position, the vacuum is released when the actuator 20 unseals the chamber 18. When unsealed, the chamber 18 allows ambient air to fill the chamber 18, thus expanding the energy absorber 16 from the compressed position to the uncompressed position. As shown in the Figures, the energy absorber 16 in the uncompressed position control kinematics of a pedestrian during certain pedestrian impacts.

The vehicle 10 may be any suitable type of automobile, e.g., a passenger or commercial automobile such as a sedan, a coupe, a truck, a sport utility, a crossover, a van, a minivan, a taxi, a bus, etc. As shown in FIG. 1, the vehicle 10 includes a vehicle body 22. The vehicle body 22 may be of a unibody construction in which a vehicle frame is unitary with the vehicle body 22 or may have a body-on-frame construction (also referred to as a cab-on-frame construction) in which the vehicle body 22 and vehicle frame are separate components, i.e., are modular, and the vehicle body 22 is supported on and affixed to the vehicle frame. Alternatively, the vehicle frame and vehicle body 22 may have any suitable construction. The vehicle frame and vehicle body 22 may be of any suitable material, for example, steel, aluminum, and/or fiber-reinforced plastic, etc.

The vehicle body 22 defines a passenger compartment to house occupants of the vehicle 10. The passenger compartment may extend across the vehicle 10, i.e., from one side 30 to the other side 30 of the vehicle 10. The passenger compartment includes a front end and a rear end with the front end being in front of the rear end during forward movement of the vehicle 10.

The vehicle body 22 includes a roof assembly including two roof rails and a vehicle roof 92. The roof rails are spaced from one another in a cross-vehicle direction. The roof rails each extend longitudinally along the vehicle body 22, i.e., along a vehicle-longitudinal axis L.

The vehicle roof 92 may define the upper boundary of the passenger compartment and may extend from the front end of the passenger compartment to the rear end of the passenger compartment. The vehicle roof 92 may extend from one roof rail to the other roof rail. The vehicle roof 92 may be irremovably fixed to the roof rails. In other words, the vehicle roof 92 is secured to the roof rails in such a way that removal requires destruction such as cutting, e.g., cutting material and/or welded joints, etc. As an example, the vehicle roof 92 may be attached to both roof rails, e.g., by welding, fasteners, etc.

The vehicle body 22 includes pillars 24 spaced from each other along the vehicle-longitudinal axis L. Specifically, the vehicle body 22 includes a front pillar 24 and a rear pillar 24 spaced vehicle-rearward from the front pillar 24 on each side 30 of the vehicle body 22. The vehicle body 22 may include one front pillar 24 and one rear pillar 24 on both sides 30 of the vehicle body 22. The pillars 24 may extend from the vehicle roof 92 to a vehicle floor. The vehicle 10 may include two front pillars 24 on either side 30 of the passenger compartment, i.e., a first front pillar 24 and a second front pillar 24. The vehicle 10 may include other pillars 24, in addition to the front pillar 24 and the rear pillar 24. Each front pillar 24, e.g., the first front pillar 24 and the second front pillar 24, may extend between the windshield 12 and the door opening.

The vehicle body 22 defines the door opening between the front pillar 24 and the rear pillar 24 of the vehicle body 22. The door opening may be between the front pillar 24 and the rear pillar 24. In other words, the front pillar 24 and rear pillar 24 are spaced from each other by the door opening. The door opening extends uninterrupted from the front pillar 24 to the rear pillar 24. The door opening allows for ingress and egress into the passenger compartment. The vehicle 10 may include any suitable number of door openings to allow for ingress and egress into the passenger compartment. For example, as shown in the Figures, the vehicle 10 may include a door opening on each side 30 of the vehicle 10. In other examples, the vehicle 10 may include multiple door openings on each side 30 of the vehicle 10.

The vehicle 10 may include the windshield 12 disposed at the front end of the passenger compartment and extending above the vehicle hood 14. The windshield 12 may extend from one side 30 of the vehicle 10 to the other side 30 of the vehicle 10. The windshield 12 may extend from the vehicle roof 92 to the vehicle hood 14. The windshield 12 may face in a forward direction from the passenger compartment. The windshield 12 may be any suitably transparent material, including glass such as laminated, tempered glass or plastic.

With reference to FIG. 1, the vehicle body 22 and/or the vehicle frame defines a utility compartment 94. As discussed further below the utility compartment 94 is below the vehicle hood 14. The utility compartment 94 may, for example, house one or more vehicle components such as powertrain components, e.g., an internal combustion engine, transmission, electric-vehicle batteries, energy-transmission hardware for electric-vehicle operation, windshield wiper assemblies 28, etc. In other words, the utility compartment 94 may be a powertrain compartment such as an engine compartment. As another example, the utility compartment 94 may include a storage space, e.g., may be a front trunk (i.e., a frunk).

The vehicle 10, e.g., the vehicle body 22, may include a cowl 96. The cowl 96 may support various vehicle components such as the vehicle hood 14, the windshield 12, a dashboard, an instrument panel, etc. The cowl 96 may be located between the passenger cabin and the utility compartment 94. The cowl 96 may include a cover, i.e., a cowl cover, as shown in the example in FIGS. 3 and 4. The cowl cover may be, for example, plastic and may include a class-A surface.

With reference to FIGS. 2-5, the vehicle body 22 includes a vehicle-hood assembly 32 having the vehicle hood 14, the energy absorber 16, and the actuator 20. The vehicle hood 14 is supported by and attached to the rest of the vehicle body 22 and/or the vehicle frame. For example, the vehicle-hood assembly 32 may include a hinge rotatably connecting the vehicle hood 14 to the rest of the vehicle body 22. The vehicle hood 14 is rotatable about the hinge between an open position (not shown) providing access to the utility compartment 94 and a closed position preventing access to the utility compartment 94. The vehicle hood 14 and the energy absorber 16 move together as a unit about the hinge as described further below. The vehicle body 22 and/or the vehicle frame includes a latch (not shown) between the vehicle hood 14 and the vehicle body 22 and/or vehicle frame. The latch selectively fixes the vehicle hood 14 in the closed position.

The vehicle hood 14 includes a top surface 34 and a bottom surface 36. The top surface 34 as shown in the Figures the top surface 34 is exposed the environment surrounding the vehicle 10 when the vehicle-hood assembly is in the closed position. The top surface 34, may present a class-A surface, e.g., a finished surface exposed to view by a customer and free of unaesthetic blemishes and defects. The bottom surface 36 faces the utility compartment 94. The energy absorber 16 may be mounted to the bottom surface 36, as described further below.

In some examples, the vehicle hood 14 may include a hood inner 38 and a hood outer 40 disposed above the hood inner 38. In such examples, the hood outer 40 includes the top surface 34 of the vehicle hood 14 and the hood inner 38 includes the bottom surface 36 of the vehicle hood 14.

The hood inner 38 and the hood outer 40 may be the same type of material or different types of material. For example, the hood inner 38 and the hood outer 40 may be metal, e.g., aluminum, steel, etc. As another example, the vehicle hood 14, e.g., the hood inner 38 and/or hood outer 40, may be plastic, for example, sheet molding composite (SMC), carbon fiber reinforced plastic (CFRP), fiberglass, and/or other fiber reinforced plastic.

The hood outer 40 is fixed relative to the hood inner 38. Specifically, the hood outer 40 is directly or indirectly attached to the hood inner 38. Alternatively, the hood inner 38 and/or the hood outer 40 may include a hem flange (not numbered) connecting the hood inner 38 to the hood outer 40.

The vehicle hood 14 may include a gap 42 (FIGS. 3 and 4) between the hood inner 38 and the hood outer 40. Specifically, the gap 42 extends vertically from the hood inner 38 to the hood outer 40. The gap 42 may extend through the hood inner 38, e.g., may be open to the utility compartment 94 below the vehicle hood 14, e.g., through one or more lightening holes 44.

With reference to FIGS. 1-2 and 5-6, the vehicle hood 14 includes a vehicle-forward end 46 and a vehicle-rearward end 48. The vehicle-forward end 46 of the vehicle hood 14 is vehicle-forward of the vehicle-rearward end 48 along the longitudinal axis L. The vehicle-rearward end 48 is a portion of the vehicle hood 14 adjacent to the windshield 12 and the vehicle-forward end 46 is a portion of the vehicle hood 14 opposite the vehicle-rearward end 48 along the vehicle-longitudinal axis L. The vehicle-rearward end 48 terminates at a vehicle-rearward edge 88 that is the rearward-most edge of the vehicle hood 14. The vehicle-forward end 46 terminates at a vehicle-forward edge 90 that is the forward-most edge of the vehicle hood 14. The vehicle-rearward end 48 is disposed vehicle rearward of the vehicle-forward end 46.

Figure 3:
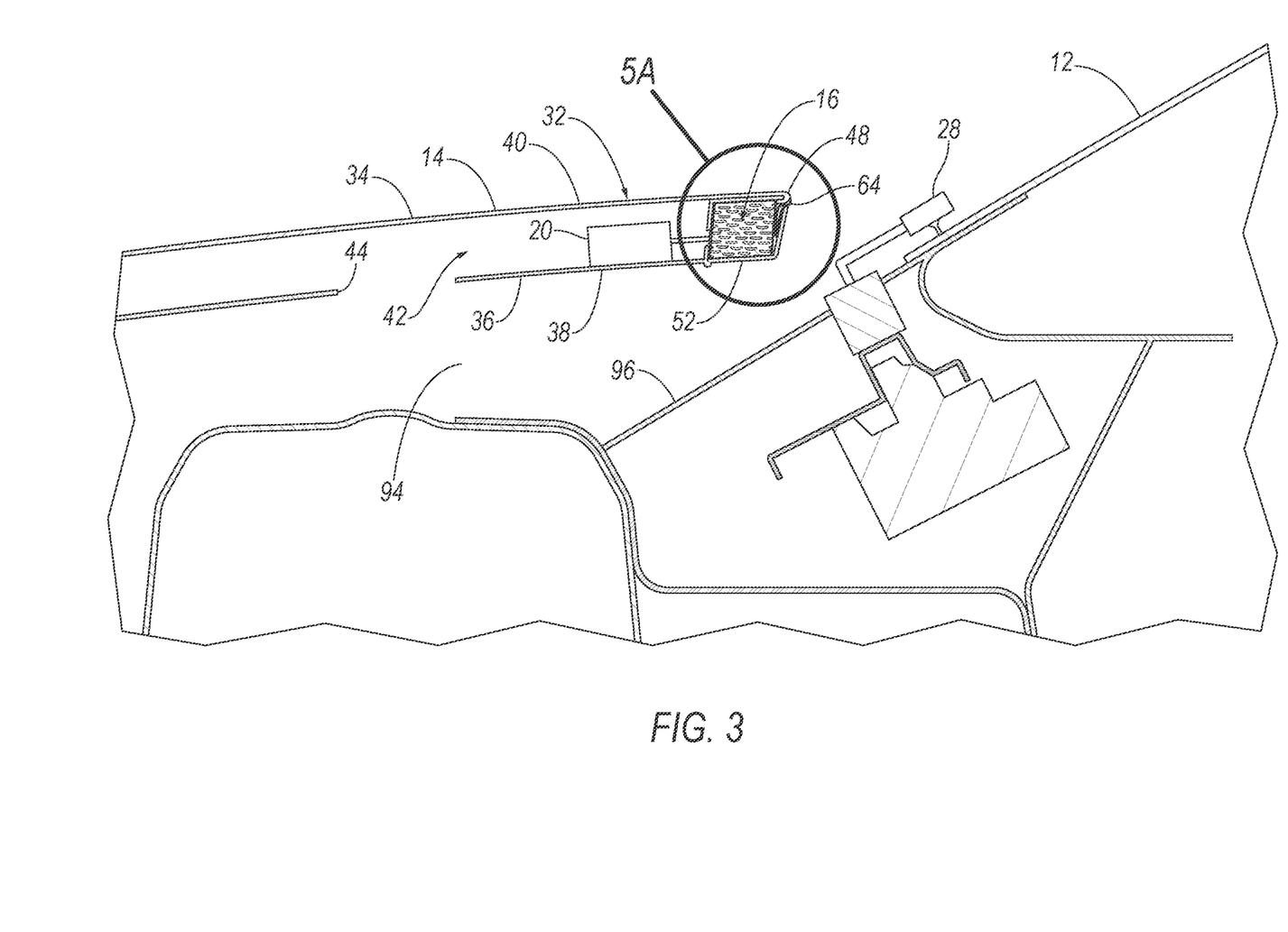
FIG. 3 is a cross-sectional view of the vehicle with the energy absorber in the compressed position.
Figure 4:
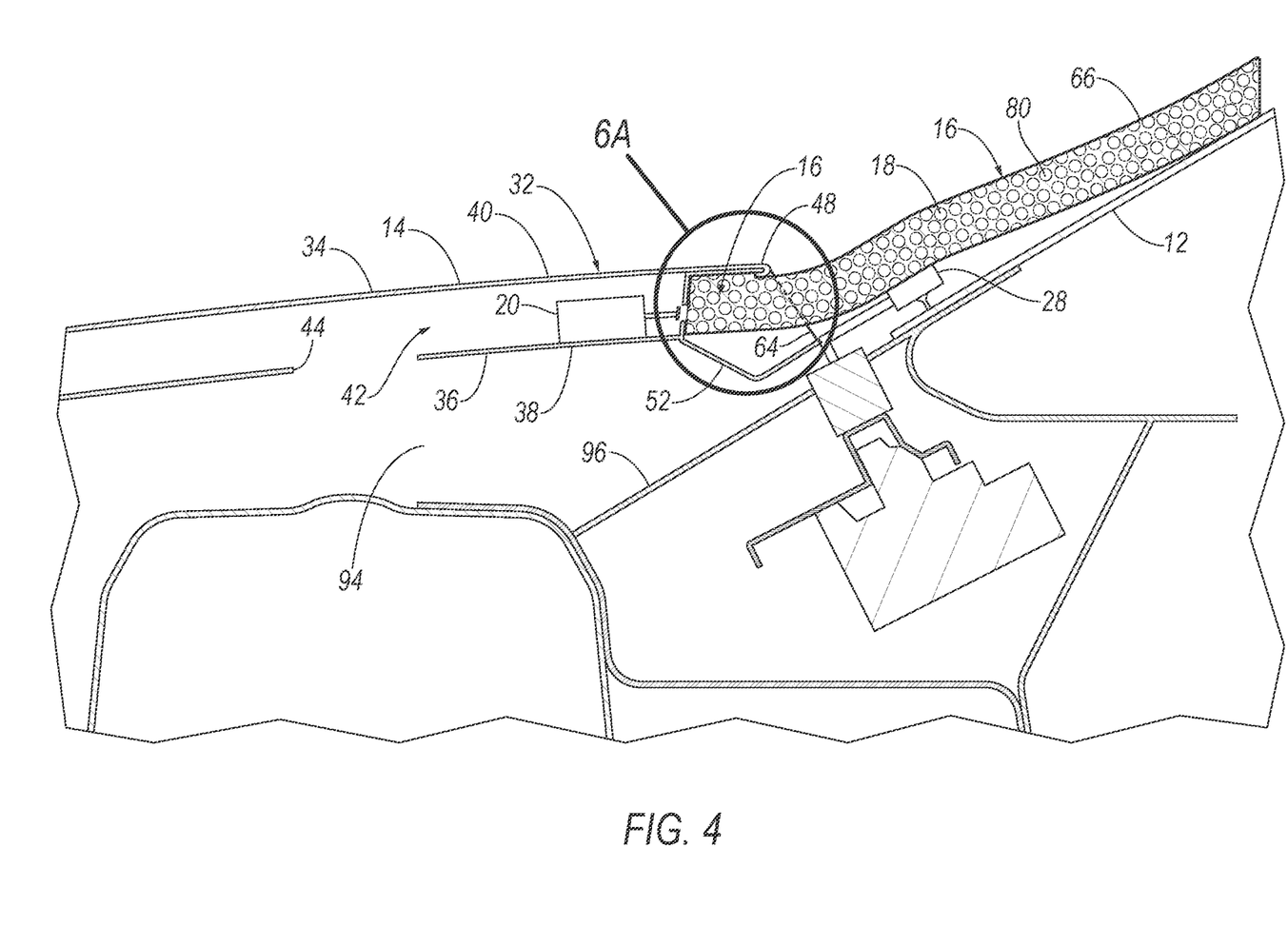
FIG. 4 is a cross-sectional view of the vehicle with the energy absorber in the uncompressed position.

With reference to FIGS. 3-6A, in some examples, the vehicle-hood assembly 32 may include a chute assembly 50 for storing the energy absorber 16 in the compressed position and guiding deployment of the energy absorber 16 from the compressed position to the uncompressed position. Specifically, in such examples, the chute assembly 50 guides the energy absorber 16 toward the windshield 12 to the uncompressed position. The chute assembly 50 may include a chute 52 pivotally connected to the vehicle hood 14, e.g., the hood inner 38. The chute 52 is in a closed position when the energy absorber 16 is in the compressed position (as shown in FIG. 3) and the chute 52 is in an open position when the energy absorber 16 is in the uncompressed position (as shown in FIG. 4). Specifically, the chute 52 may pivot relative to the vehicle hood 14 from the closed position to the open position, as described further below. In other examples, the movement of the energy absorber 16 toward the windshield 12 to the uncompressed position may be guided by other components of the vehicle 10, e.g., the cowl 96, the vehicle hood 14, the windshield 12, etc., in addition to or in the alternative to the chute assembly 50.

The chute 52 may be between the vehicle hood 14, e.g., the hood outer 40, and the utility compartment 94. Specifically, the chute 52 may be between the energy absorber 16 and the cowl 96 when the chute 52 is in the closed position. The chute 52 may pivot towards the cowl 96 when the chute 52 deploys from the closed position to the open position. In the closed position the chute 52 may be spaced from the cowl 96. In some examples, the chute 52 in the open position may be spaced from the cowl 96, as shown in the Figures. In other examples, the chute 52 may abut the cowl 96 in the open position. In such examples, the abutment of the chute 52 against the cowl 96 in the open position positions the chute 52 in the open position to guide the energy absorber 16. In other words, the cowl 96 acts as a reaction surface to stop movement of the chute 52 in the open position to guide the energy absorber 16 to the uncompressed position.

Figure 5:
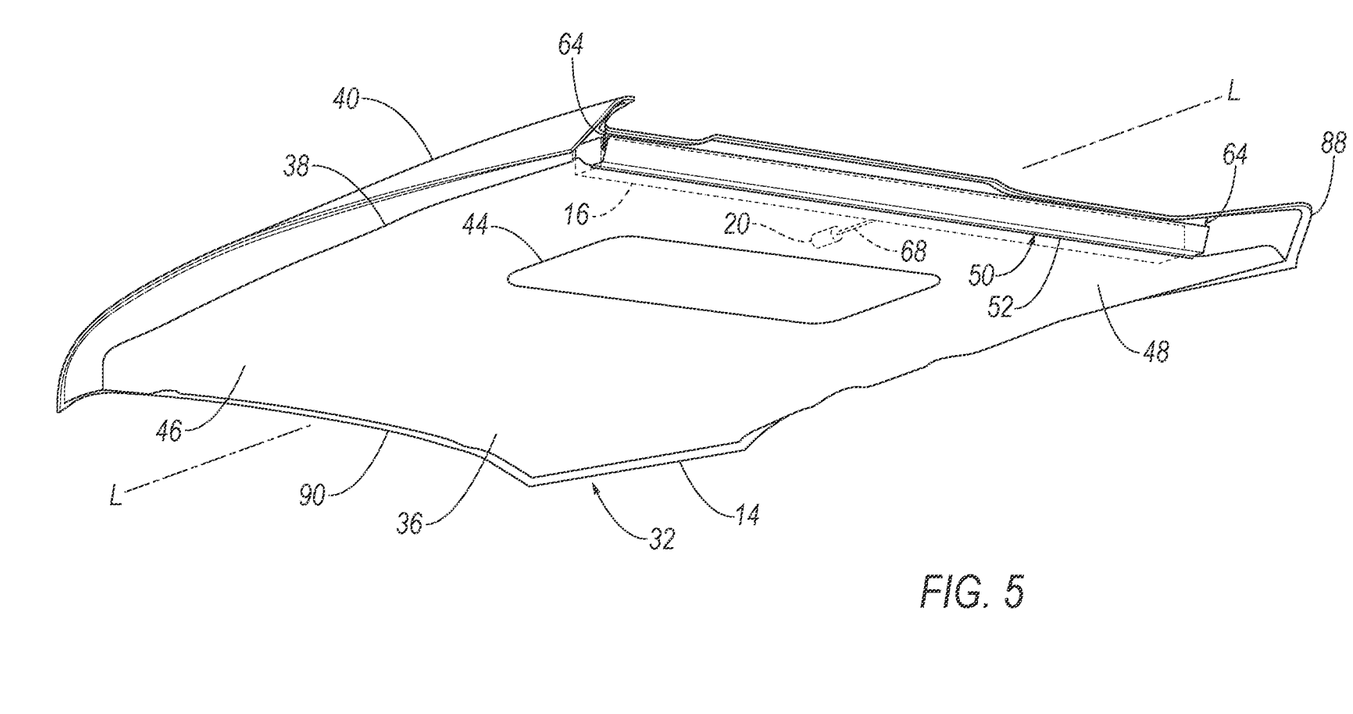
FIG. 5 is a perspective view of the vehicle-hood assembly showing a hood inner of the vehicle hood and the energy absorber with the energy absorber in a compressed position.
Figure 6:
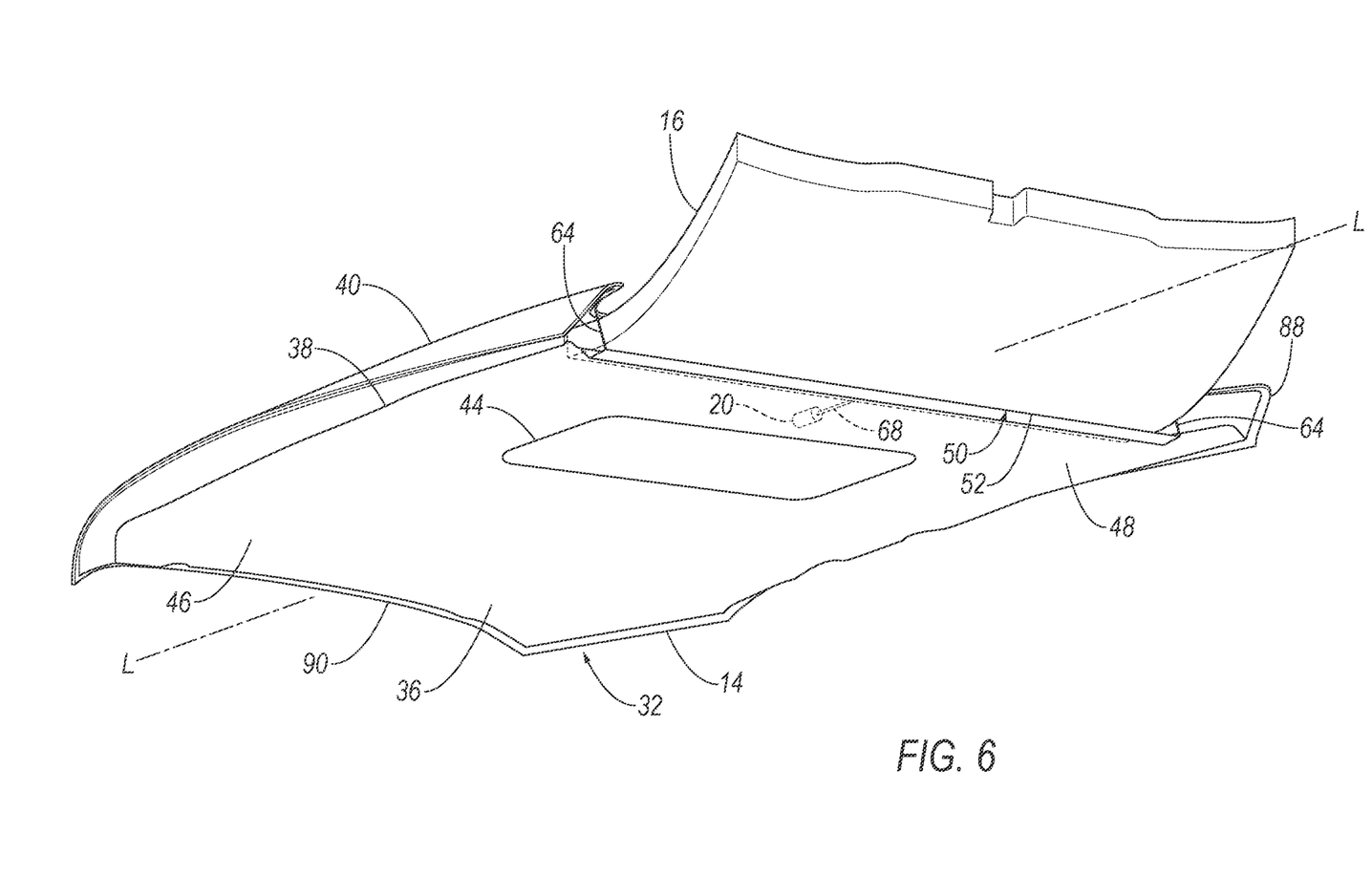
FIG. 6 is a perspective view of the vehicle-hood assembly showing the hood inner of the vehicle hood and the energy absorber with the energy absorber in a compressed position.

With reference to FIGS. 5 and 6, the chute 52 may be on the vehicle-rearward end 48 of the vehicle hood 14. The chute 52 may be below the vehicle-rearward edge 88 of the vehicle hood 14 in the open position and/or the closed position. In the example shown in the Figures, e.g., FIGS. 3 and 4, the chute 52 is below the vehicle-rearward edge 88 in both the open position and the closed position. In the example shown in the Figures, the chute 52 is below the vehicle hood 14 in the closed position and pivots downwardly toward the cowl 96, as described further below, to the open position below the vehicle hood 14.

The chute 52 may be elongated in the cross-vehicle direction. In other words, the longest dimension of the chute 52 may be along the cross-vehicle direction. The chute 52 may be elongated along the vehicle-rearward end 48, e.g., along the vehicle-rearward edge 88, of the vehicle hood 14. In some examples, the chute 52 may extend continuously, i.e., unbroken, from one side 30 of the vehicle body 22 to the other side 30 of the vehicle body 22. In other examples, the vehicle-hood assembly 32 may include more than one chute assembly 50 spaced from each other in the cross-vehicle direction. In such examples, the chute 52 of each chute assembly 50 may be spaced from adjacent ones of the chutes 52 in the cross-vehicle direction.

As set forth above, the chute 52 may be pivotally connected to the vehicle hood 14. In some examples a hinge 54 is between the chute 52 and the vehicle hood 14, e.g., the hood inner 38. The hinge 54 may be on the bottom surface 36 of the vehicle hood 14, e.g., bottom surface 36 of the hood inner 38. The hinge 54 allows for pivoting of the chute 52 relative to the vehicle hood 14 from the closed position to the open position as the energy absorber 16 moves from the compressed position to the uncompressed position. The hinge 54 is designed to maintain the chute 52 in the closed position absent application of a force of a predetermined magnitude, e.g., force applied by the energy absorber 16 on the chute 52 as the energy absorber 16 moves from the compressed position to the uncompressed position. As an example, the hinge 54 maintains the chute 52 in the closed position during normal operation of the vehicle 10 such as driving over bumps, braking, etc. As an example, the hinge 54 may be a living hinge. The living hinge may be a portion of the chute 52 and/or the vehicle hood 14 that deforms during application of the predetermined force, e.g., force applied by the energy absorber 16 on the chute 52 as the energy absorber 16 moves from the compressed position to the uncompressed position. The living hinge is bendable relative to the adjacent portions of the chute 52 and/or vehicle hood 14. For example, the living hinge may be an area weakened geometry and/or decreased material thickness on the chute 52 and/or the vehicle hood 14. In other examples, the hinge 54 may be of any suitable type. In some examples, more than one hinge 54 may be between the chute 52 and the vehicle hood 14.

Figure 5A:
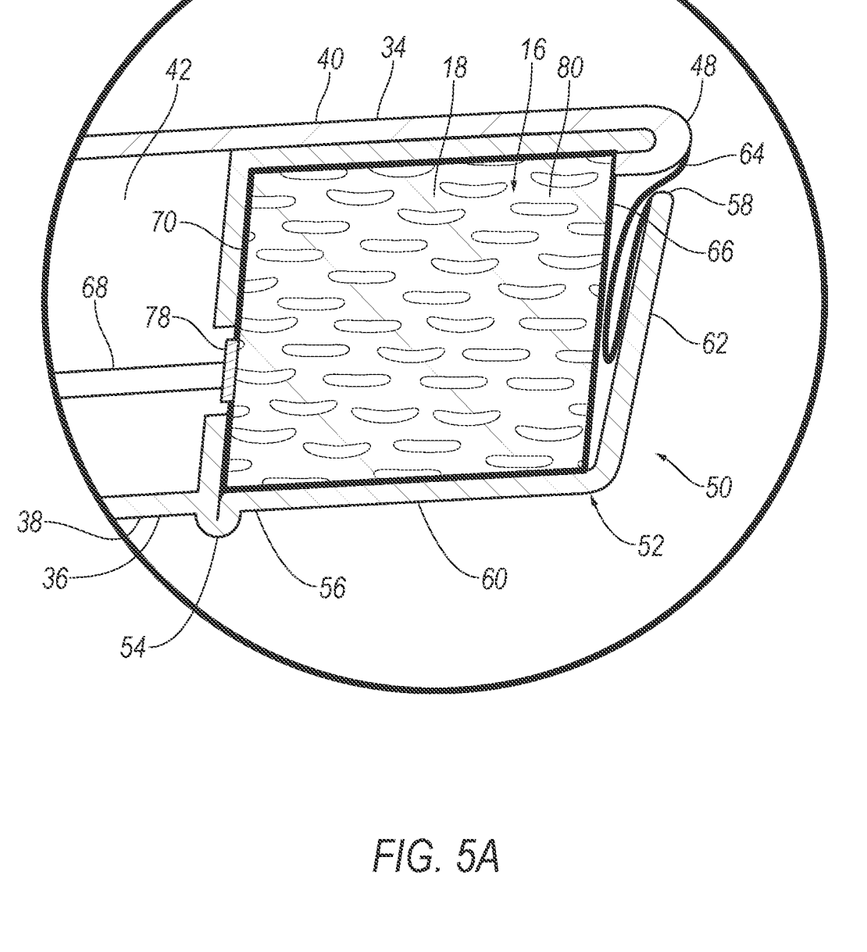
FIG. 5A is a cross-sectional view of a portion of the vehicle-hood assembly of FIG. 5.
Figure 6A:
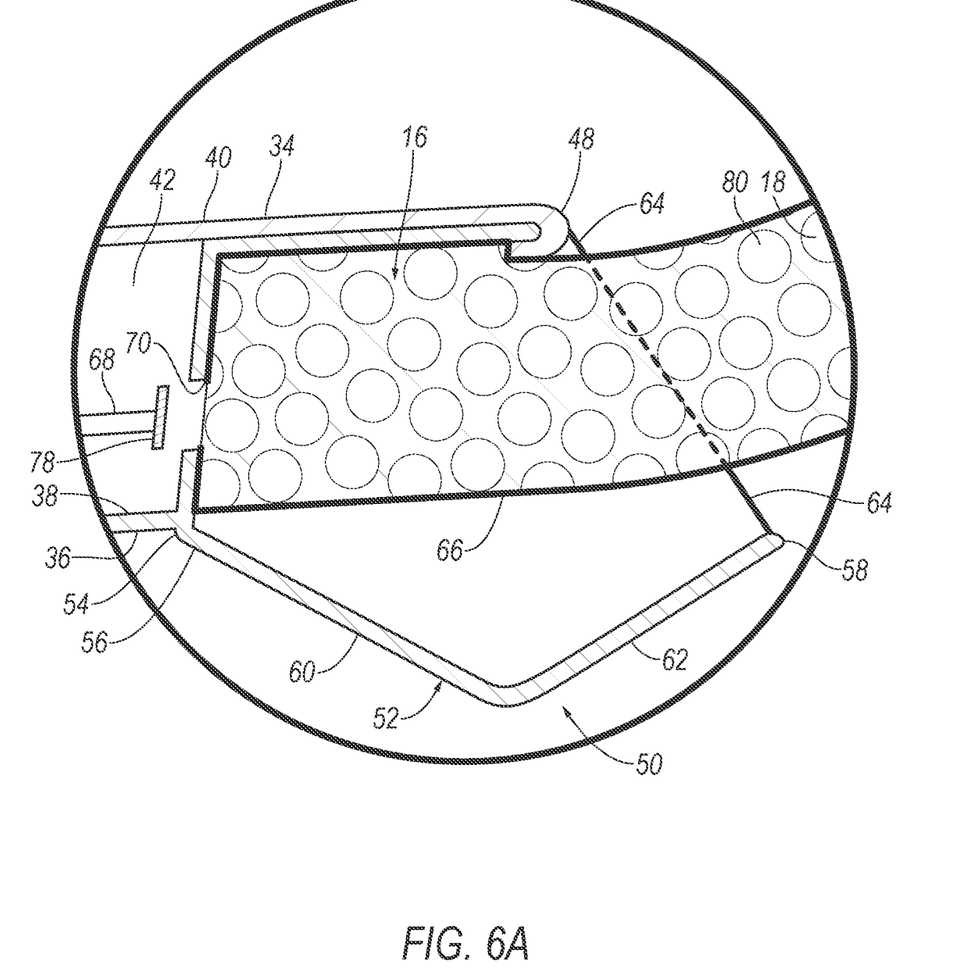
FIG. 6A is a cross-sectional view of a portion of the vehicle-hood assembly of FIG. 6.

With reference to FIGS. 5A and 6A, the chute 52 includes a proximate end 56 at the vehicle hood 14 and a distal end 58 spaced from the proximate end 56. The distal end 58 may be spaced vehicle-rearward of the proximate end 56. In examples including the hinge 54, the proximate end 56 is connected to the hinge 54 and the distal end 58 is spaced from the hinge 54. In the example shown in the Figures, the chute 52 extends from the proximate end 56 in a vehicle rearward direction. In the example shown in the Figures, the distal end 58 abuts the vehicle hood 14, e.g., the hood inner 38, when the chute 52 is in the closed position. In such examples, the chute 52 may enclose the energy absorber 16 between the chute 52 and the vehicle hood 14.

The chute 52 may include a base 60 and a lip 62. The base 60 and the lip 62 may be transverse to each other, as shown in the example in the Figures. In some examples, the base 60 and the lip 62 may meet at an angle and in other examples the chute 52 may curve from the base 60 to the lip 62. The base 60 includes the proximate end 56 and the lip 62 includes the distal end 58. The base 60 is connected to the vehicle hood 14. For example, in the example shown in the Figures, the base 60 is connected to the hinge 54 and is indirectly connected to the vehicle hood 14 through the hinge 54. The base 60 may support the lip 62 on the vehicle hood 14, i.e., the weight of the lip 62 may be borne by the base 60.

The chute assembly 50 may include one or more tethers 64 extending from the chute 52 to the vehicle hood 14. The tether 64 positions the chute 52 in the open position. Specifically, the tether 64 is slack between the chute 52 and the vehicle hood 14 when the chute 52 is in the closed position. As the chute 52 pivots from the closed position to the open position, the tether 64 becomes taut between the chute 52 and the vehicle hood 14 to stop the pivoting of the chute 52 in the open position. The tether 64 may extend from the hood inner 38 to the lip 62, e.g., the distal end 58. The tether 64 may be fixed to the vehicle hood 14 and the chute 52 in any suitable manner, e.g., with fasteners, hooks, brackets, etc. The tether 64 may be, for example, a metal cord, woven and/or braided fabric, etc.

The chute 52 may be positioned to direct the energy absorber 16 toward the windshield 12 from the compressed position to the uncompressed position. Specifically, the chute 52 guides movement of the energy absorber 16 to abut the windshield 12 in the uncompressed position. The energy absorber 16 may abut the chute 52 in the uncompressed position and/or as the energy absorber 16 moves from the compressed position to the uncompressed position. The vehicle hood 14 and/or the windshield 12 may guide movement, in addition to the chute 52, to the uncompressed position abutting the windshield 12. The lip 62 may guide the movement of the energy absorber 16 upwardly toward the windshield 12. The chute 52 may be rigid relative to the energy absorber 16 to act as a reaction surface for the energy absorber 16 as the energy absorber 16 deploys from the compressed position to the uncompressed position. The chute 52 may be plastic, metal, fiberglass or other suitable materials.

As set forth above, the vehicle-hood assembly 32 includes the energy absorber 16. During certain pedestrian impacts, the energy absorber 16 is deployed from the compressed position to the uncompressed position across at least a portion of the windshield 12 to control the kinematics of a pedestrian during certain pedestrian-vehicle impacts. The energy absorber 16 expands in a direction away from the vehicle hood 14 toward the windshield 12 and across at least a portion of the windshield 12 from the compressed position to the uncompressed position. Specifically, the energy absorber 16 expands vehicle-rearward and upwardly from the vehicle hood 14 to the windshield 12. The energy absorber 16 may abut the windshield 12 in the uncompressed position, i.e., the energy absorber 16 directly contacts the windshield 12 in the uncompressed position.

In some examples, the energy absorber 16 may extend continuously, i.e., unbroken, from one side 30 of the vehicle body 22 to the other side 30 of the vehicle body 22. As an example, the energy absorber 16 may be elongated from the first front pillar 24 toward the second front pillar 24 in the uncompressed position, as shown in the examples in the Figures. In other examples, the vehicle-hood assembly 32 may include more than one energy absorber 16 spaced from each other in the cross-vehicle direction.

The energy absorber 16 may be elongated in the cross-vehicle direction in the uncompressed position. In other words, the longest dimension of the energy absorber 16 may be along the cross-vehicle direction. The energy absorber 16 may be elongated along the vehicle-rearward end 48, e.g., along the vehicle-rearward edge 88, of the vehicle hood 14.

The energy absorber 16 is releasable to expand in a direction away from the vehicle hood 14 from the compressed position to the uncompressed position. Specifically, the energy absorber 16 expands from the compressed position to the uncompressed position to the windshield 12. In the examples shown in the Figures, the energy absorber 16 expands upwardly away from the bottom surface 36 of the vehicle hood 14.

The energy absorber 16 is spaced from the windshield 12 in the compressed position (FIG. 3) and may abut the windshield 12 in the uncompressed position (FIG. 4). In the uncompressed position, a rearward edge of the energy absorber 16 may abut the windshield 12. The rearward edge of the energy absorber 16 is spaced vehicle-rearward from the vehicle hood 14 and above the vehicle hood 14 in the uncompressed position.

The energy absorber 16 may be supported by the vehicle hood 14. In other words, the weight of the energy absorber 16 is born by the vehicle hood 14. With reference to FIGS. 5-6A, the energy absorber 16 is fixed to the vehicle hood 14 in both the compressed and the uncompressed position. As an example, the energy absorber 16 may be mounted to the bottom surface 36 of the vehicle hood 14. As an example, the energy absorber 16 may be mounted to the bottom surface 36 with an adhesive (FIGS. 5A and 3A) and/or fixed to the bottom surface 36 with fasteners, plastic welding, pins, etc. In examples including adhesive bonding the energy absorber 16 to the bottom surface 36, the adhesive may extend along the elongated path along the periphery of the energy absorber 16. The adhesive may be, for example, polyurethane or any suitable type of adhesive.

In the example shown in the Figures, the energy absorber 16 may be mounted to the vehicle-rearward end 48 of the vehicle hood 14. in the compressed position. Specifically, the energy absorber 16 is unobstructed at the vehicle-rearward end 48 of the vehicle hood 14 so that the energy absorber 16 may release from the vehicle-rearward and across the windshield 12.

The energy absorber 16 expands in a direction away from the vehicle hood 14 from the compressed position to the uncompressed position. Specifically, the energy absorber 16 expands vehicle-rearward from the vehicle hood 14 to the windshield 12. The energy absorber 16 in the uncompressed position covers at least a portion of the windshield 12, specifically at least a bottom portion of the windshield 12. In the example shown in the Figures, the energy absorber 16 extends from the vehicle hood 14 toward the vehicle roof 92 more than one third of the distance of the windshield 12 from the vehicle hood 14 to the vehicle roof 92. The energy absorber 16 is positioned to expand across the windshield 12. As set forth above, the chute assembly 50, the hood, the cowl 96, and/or the windshield 12 guides the movement of the energy absorber 16 across the windshield 12 from the compressed position to the uncompressed position.

With reference to FIGS. 5A and 6A, the chamber 18 of the energy absorber 16 is sealed and in the compressed position is sealed in the compressed position. Specifically, the energy absorber 16 may include a membrane 66 surrounding the chamber 18. The membrane 66 is impermeable to air. Specifically, the membrane 66 hermetically seals the chamber 18.

The chamber 18 of the energy absorber 16 is vacuum pressurized in the compressed position. In other words, the chamber 18 is at a negative pressure relative to external ambient air. Since the chamber 18 is sealed, the negative pressure is maintained. For example, the membrane 66 maintains the negative pressure in the chamber 18.

As set forth below, the actuator 20 configured to unseal the chamber 18 to release the energy absorber 16 from the compressed position to the uncompressed position. The actuator 20 releases the negative pressure in the chamber 18 to external ambient air. The actuator 20 is operatively connected to each of the energy absorbers 16 to unseal the chambers 18 of the energy absorbers 16. Specifically, the actuator 20 is operatively connected to the membrane 66 to open the chamber 18 to external ambient air allowing the chamber 18 to de-pressurize and the energy absorber 16 to expand to the uncompressed position. For example, a cord 68 may extend from the actuator 20 to the energy absorber 16 and the actuator 20 may be designed to pull the cord 68 to disengage the cord 68 from the energy absorber 16 and open the chamber 18 to external ambient air. Specifically, the cord 68 opens a hole 70 (FIGS. 5-6A) through the membrane 66 to allow external ambient air to flow therethrough. For example, the cord 68 may be fixed to a plug 78 of the energy absorber to pull the plug 78 from the membrane 66, as described further below. In such examples, the cord 68 may be fixed to the plug 78 in any suitable fashion. As another example, the cord 68 may be connected directly to the membrane 66 and may tear the hole 70 in the membrane 66.

In some examples, more than one cord 68 may be connected to the actuator 20 and one or more energy absorbers 16, e.g., a first cord, a second cord, and a third cord. For example, in the example shown in FIG. 7, more than one cord 68 may extend to the energy absorber 16. In other examples including more than one energy absorber 16, multiple cords 68 may extend to multiple energy absorbers 16, respectively. In examples including more than one cord 68, each of the cords 68 may extend to the actuator 20, as shown in the example in FIG. 7. In other examples, one cord 68 may extend from the actuator 20 and other cords 68 may branch from that cord 68 to the energy absorber 16.

As an example shown in FIGS. 5-6A, the energy absorber 16 includes the plug 78. The plug 78 may extend through the membrane 66. The plug 78 maintains the energy absorber 16 in the compressed state. Specifically, the plug 78 fills the hole 70 and prevents airflow through the hole 70 to maintain the energy absorber 16 in the compressed state. The cord 68 extend may from the actuator 20 to the plug 78. The actuator 20 is operatively connected to the plug 78 to disconnect the plug 78 from the membrane 66, e.g., with the cord 68, and open the chamber 18 to external ambient air to release the energy absorber 16 to the uncompressed state. In examples including more than one plug 78, the actuator 20 may be operatively connected to each plug 78 to disconnect the plug 78 from the membrane 66. The plug 78 may be the same type of material as the membrane 66 or a different type of material. The plug 78 may be thicker than the membrane 66. The plug 78 may be connected to the membrane 66 by adhesive, bonding, welding, etc. As another example, the plug 78 may be unitary with the membrane 66. In other words, the plug 78 and the membrane 66 may be a single, uniform piece of material with no fasteners, adhesives, weld lines, etc., holding them together, i.e., formed together simultaneously as a single continuous unit, e.g., by molding, etc. In such an example, the energy absorber 16 may have a weakened area, e.g., a tear seam, between the plug 78 and the membrane 66. Non-unitary components, in contrast, are formed separately and subsequently assembled, e.g., by adhesive, bonding, welding, etc. As another example in the alternative to the plug 78, the cord 68 may be connected to an outer surface of the membrane 66 and/or may be embedded in the membrane 66 such that, when the actuator 20 pulls the cord 68, the cord 68 tears the membrane 66 to open the chamber 18 to external ambient air.

The energy absorber 16 expands in size from the compressed position to the uncompressed position. In other words, the energy absorber 16 is relatively smaller in the compressed position and expands in size from the compressed position to the uncompressed position. For example, when vacuum pressurized, the vacuum in the chamber 18 retracts the membrane 66, e.g., folds the membrane 66 onto itself. In such an example, the chamber 18 is smaller in the compressed position than in the uncompressed position. The energy absorber 16 is designed to expand in size toward the windshield 12, e.g., to expand from the vehicle-rearward edge 88 of the vehicle hood 14 to across the windshield 12.

The energy absorber 16 may include foam 80 in the chamber 18. With reference to the Figures, the foam 80 may be an open-celled foam 80. In such an example, the open-celled foam 80 is in the cavity. For example, the open-celled foam 80 may fill the cavity. The open-celled foam 80 is compressed, i.e., reduced in size under pressure, in the compressed position. For example, the vacuum pressurization of the chamber 18 compresses the open-celled foam 80 in the compressed position of the energy absorber 16. In such an example, the membrane 66 acts on the open-celled foam 80 to compress the open-celled foam 80. When compressed in the compressed position, the open-celled foam 80 is resiliently compressed. In other words, when external compressive forces of the membrane 66 are released when the chamber 18 is exposed to external ambient air, the open-celled foam 80 expands. This expansion forces the membrane 66 to expand as the energy absorber 16 moves to the uncompressed position. In other words, the vacuum pressurization of the chamber 18 draws in the membrane 66 to compress the open-celled foam 80 in the compressed position, and when the vacuum pressurization is released, the compressive force of the membrane 66 on the open-celled foam 80 is released and the open-celled foam 80 moves the membrane 66 to the uncompressed position.

The open-celled foam 80 includes cells. In the compressed position of the energy absorber 16, the cells are compressed, as shown in FIG. 5A. The cells resiliently decompress and expand in size when the energy absorber 16 moves to the decompressed position, as shown in FIG. 6A. The cells may fill with air as the energy absorber 16 moves from the compressed position to the uncompressed position. The open-celled foam 80 may be, for example, open-celled polyurethane or any suitable type of material. As another example, the chamber 18 may be filled with any suitable type of foam 80 including compressible closed-cell foam 80 that is compressed by the membrane 66 in the compressed position and released by the membrane 66 in the uncompressed position.

In the example in which the energy absorber 16 includes open-celled foam 80 in the cavity, the membrane 66 may be silicone. In such an example, the membrane 66 may be applied as a silicone coating sprayed onto the open-celled foam 80. As another example in which the energy absorber 16 includes open-celled foam 80 in the cavity, the membrane 66 may be the same material type as the open-celled foam 80 and may be solid to prevent airflow therethrough.

As set forth above, the vehicle-hood assembly 32 may include one or more actuators 20. The example shown in the Figures includes one actuator 20 by way of example, i.e., the actuator 20 is operatively connected to each of the energy absorbers 16. The actuator 20 may be supported by the vehicle hood 14, i.e., the weight of the actuator 20 is borne by the vehicle hood 14. The actuator 20 may be mounted to the bottom surface 36 of the vehicle hood 14 in any suitable fashion, e.g., threaded fasteners, brackets, welding, etc. The actuator 20 may be disposed in the gap 42 between the hood inner 38 and hood outer 40.

In examples including more than one actuator 20, the actuators 20 may be of the same type. One actuator 20 may release one or more energy absorbers 16 to the uncompressed position. In the example shown in the Figures, one actuator 20 simultaneously releases all of the energy absorbers 16 to the uncompressed position.

The actuators 20 are configured to unseal the chamber 18 to release the energy absorbers 16 from the compressed position to the uncompressed position. For example, as described above, the actuator 20 is operatively connected to the plug 78. Specifically, in the example shown in the Figures, the cord 68 extends from the actuator 20 to the energy absorber 16. In the example shown in FIGS. 1 and 2, the cord 68 extends from the actuator 20 to one location of the energy absorber 16. The cord 68 in the example shown in the FIG. 7 includes multiple branches that connect to multiple locations on the energy absorber 16. In such an example, the cord 68 is pulled by the actuator 20 to simultaneously release the energy absorber 16 to the uncompressed position.

The actuator 20 may be pyrotechnically activated, e.g., a pyrotechnic actuator, to release the energy absorber 16 from the compressed position to the uncompressed position, e.g., to pull the cord 68. In such an example, the actuator 20 includes a pyrotechnic charge in a housing. The pyrotechnic charge is activated to activate the actuator 20. The pyrotechnic device may be, for example, a rotary actuator 20 or a linear actuator 20. The pyrotechnic charge is combustible to produce a gas, e.g., to retract a piston or turn a wheel, to retract the cord 68 into the housing of the actuator 20. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). The cord 68 may be metal, polymeric, or any suitable type of material.

Figure 7:
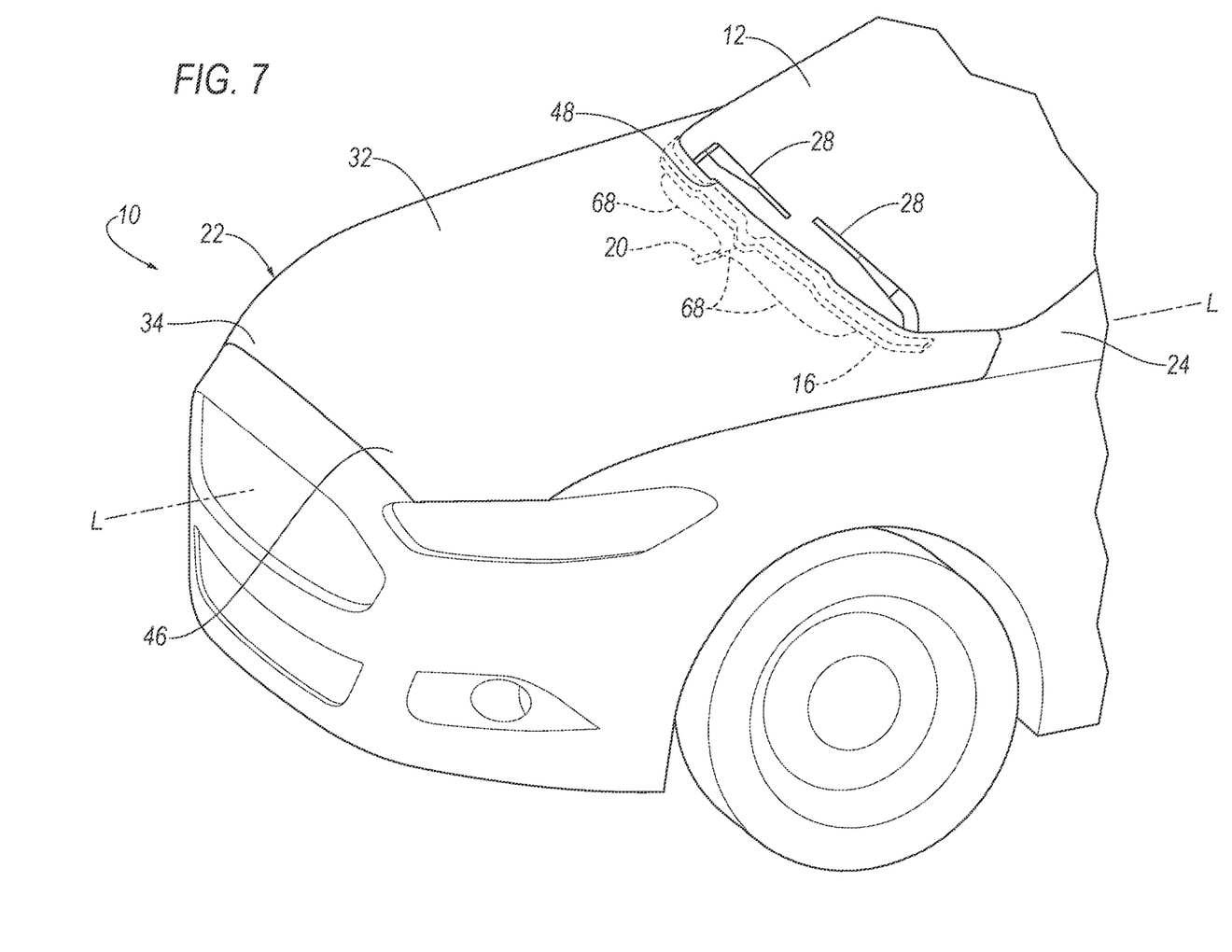
FIG. 7 is a perspective view of the vehicle with the vehicle hood with the energy absorber in the compressed position in broken lines below the vehicle hood and multiple cords extending from the actuator to the energy absorber.
Figure 8:
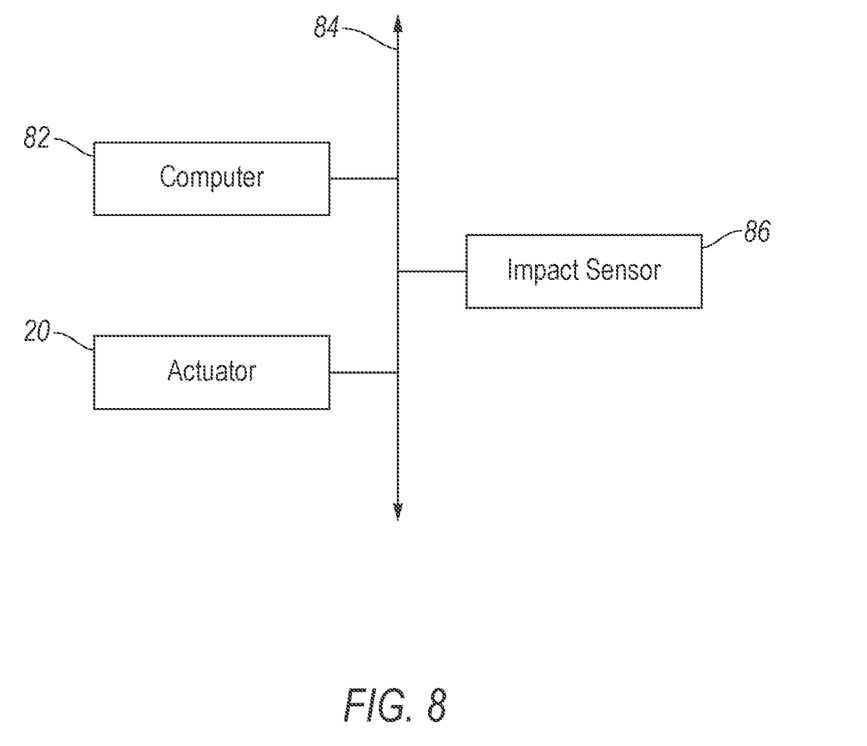
FIG. 8 is a block diagram of a system of the vehicle.

With reference to FIG. 7, the vehicle 10 includes a computer 82 that controls the actuator 20 based on input from impact sensors. Use of "in response to," "based on," and "upon determining" herein indicates a causal relationship, not merely a temporal relationship. The computer 82 may be, for example, a restraints control module. The computer 82 includes a processor and a memory. The memory includes one or more forms of computer readable media, and stores instructions executable by the computer 82 for performing various operations, including as disclosed herein. For example, a computer 82 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 82 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 82. The memory can be of any type, e.g., hard disk drives, solid state drives, servers, or any volatile or non-volatile media. The memory can store the collected data sent from the sensors. The memory can be a separate device from the computer 82, and the computer 82 can retrieve information stored by the memory via a network in the vehicle 10, e.g., over a CAN bus, a wireless network, etc. The computer 82 is generally arranged for communications on a vehicle communication network 84 that can include a bus in the vehicle 10 such as a controller area network CAN or the like, and/or other wired and/or wireless mechanisms. Alternatively or additionally, in cases where the computer 82 includes a plurality of devices, the vehicle communication network 84 may be used for communications between devices represented as the computer 82 in this disclosure. Further, as mentioned below, various controllers and/or sensors may provide data to the computer 82 via the vehicle communication network 84.

The vehicle 10 may include at least one impact sensor 86 for sensing certain impact of the vehicle 10 (e.g., pedestrian impacts of a certain magnitude, direction, etc.), and the computer 82 is in communication with the impact sensor 86 and the actuator 20. The computer 82 may activate the actuator 20, e.g., provide an impulse to a pyrotechnic charge of the actuator 20 when the impact sensor 86 senses certain pedestrian impacts. The impact sensor 86 is configured to detect a certain impacts to the vehicle 10. In other words, a "certain vehicle impact" is an impact of the type and/or magnitude for which release of the energy absorber 16 from the compressed position to the uncompressed position is designed i.e., "certain" indicates the type and/or magnitude of the impact. The type and/or magnitude of such "certain vehicle impacts" may be pre-stored in the computer 82, e.g., a restraints control module and/or a body control module. The impact sensor 86 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 86 may be located at numerous points in or on the vehicle 10.

The numerical adjectives, e.g., "first," "second," "third," and "fourth," are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a windshield;
a vehicle hood;
an energy absorber fixed to the vehicle hood, the energy absorber being releasable from a compressed position to an uncompressed position, the energy absorber being spaced from the windshield in the compressed position and abutting the windshield in the uncompressed position;
the energy absorber including a chamber that is sealed and vacuum pressurized in the compressed position; and
an actuator configured to unseal the chamber to release the energy absorber from the compressed position to the uncompressed position.

2. The vehicle of claim 1, further comprising a first front pillar and a second front pillar, the energy absorber being elongated from the first front pillar toward the second front pillar in the uncompressed position.

3. The vehicle of claim 1, wherein the energy absorber includes open-celled foam.

4. The vehicle of claim 1, wherein the energy absorber includes foam in the chamber and a membrane surrounding the chamber, the membrane being impermeable to air.

5. The vehicle of claim 4, wherein the energy absorber includes a plug through the membrane, the actuator being operatively connected to the plug to disconnect the plug from the membrane.

6. The vehicle of claim 5, further comprising a cord extending from the actuator to the plug.

7. The vehicle of claim 4, wherein the energy absorber includes two plugs spaced from each other along the membrane and extending through the membrane, the actuator being operatively connected to both plugs to disconnect both plugs from the membrane.

8. The vehicle of claim 4, further comprising a cord extending from the actuator to the energy absorber.

9. The vehicle of claim 8, further comprising a second cord extending from the actuator to the energy absorber, the second cord being spaced from the cord at the energy absorber.

10. The vehicle of claim 4, wherein the energy absorber includes an open-celled foam.

11. The vehicle of claim 1, wherein the actuator is a pyrotechnic actuator.

12. The vehicle of claim 1, further comprising a chute connected to the vehicle hood and positioned to direct the energy absorber toward the windshield from the compressed position to the uncompressed position.

13. The vehicle of claim 1, wherein the energy absorber is elongated in a cross-vehicle direction in the uncompressed position.

14. The vehicle of claim 1, wherein the vehicle hood has a bottom surface and the energy absorber is mounted to the bottom surface.

15. The vehicle of claim 14, wherein the actuator is mounted to the bottom surface of the vehicle hood.

16. The vehicle of claim 14, wherein the vehicle hood has a vehicle-forward end and a vehicle-rearward end disposed vehicle rearward of the vehicle-forward end, the energy absorber being mounted to the vehicle hood at the vehicle-rearward end.

17. The vehicle of claim 1, wherein the vehicle hood has a vehicle-forward end and a vehicle-rearward end disposed vehicle rearward of the vehicle-forward end, the energy absorber being mounted to the vehicle hood at the vehicle-rearward end.

18. The vehicle of claim 1, wherein the energy absorber in the uncompressed position includes a rearward edge abutting the windshield, the rearward edge being spaced vehicle-rearward from the vehicle hood and above the vehicle hood in the uncompressed position.

19. The vehicle of claim 18, wherein the vehicle hood has a vehicle-forward end and a vehicle-rearward end disposed vehicle rearward of the vehicle-forward end, the energy absorber being mounted to the vehicle hood at the vehicle-rearward end in the compressed position, the rearward edge of the energy absorber being spaced vehicle-rearward from the vehicle-rearward end of the vehicle hood and above the vehicle-rearward end of the vehicle hood.

* * * * *